United States Patent [19]

Pinkerton

[11] Patent Number: 4,945,273
[45] Date of Patent: Jul. 31, 1990

[54] HIGH EFFICIENCY ELECTRICAL MACHINE

[75] Inventor: Joseph F. Pinkerton, Birmingham, Mich.

[73] Assignee: Pinkerton Generator Inc., Birmingham, Mich.

[21] Appl. No.: 443,356

[22] Filed: Nov. 30, 1989

[51] Int. Cl.⁵ .............................................. H02K 3/28
[52] U.S. Cl. ..................................... 310/208; 310/268
[58] Field of Search ................. 310/46, 154, 208, 261, 310/268

[56] References Cited

U.S. PATENT DOCUMENTS

| | | | |
|---|---|---|---|
| 2,853,637 | 9/1958 | Ishikawa | 310/268 |
| 3,348,086 | 10/1967 | Monma | 310/268 |
| 3,638,056 | 1/1972 | Imris | 310/269 |
| 4,220,879 | 9/1980 | Hoshimi et al. | 310/268 |
| 4,859,890 | 8/1989 | Sedgewick | 310/208 |

FOREIGN PATENT DOCUMENTS

953932  4/1964  United Kingdom ................ 310/268

*Primary Examiner*—Steven L. Stephan
*Assistant Examiner*—D. L. Rebsch
*Attorney, Agent, or Firm*—Beveridge, DeGrandi & Weilacher

[57] ABSTRACT

A rotor has outside conductors and inside conductors. The outside conductors are connected together at spaced connection points to form an outside loop which is preferably triangular. Each inside conductor has an outer end connected to one of the connection points, and an inner end provided with an output electrical connection. Each outside conductor and the inside conductors connected to its connection points form an inside loop that occupies only a portion of the rotor's circumference. The rotor lies in oppositely oriented magnetic fields which are disposed so that the total magnetic flux through all of the inside conductors varies during rotation, and the total magnetic flux across the outside loop is zero at all times during rotation.

67 Claims, 5 Drawing Sheets

HIGH EFFICIENCY ELECTRICAL MACHINE

BACKGROUND OF THE INVENTION

This invention relates to electric motors or generators which are referred to generically herein as electric machines.

Modern electric generators are reasonably efficient, but it is believed that the generator according to this invention is able to obtain a very high efficiency so that a maximum amount of electrical output energy can be obtained for a given quantity of mechanical input energy.

A generator disclosed in Imris U.S. Pat. No. 3,638,056 is similar to the present invention in the respect that both may have rotors with triangular conductor loops. However, the present invention uses a different arrangement of conductors on the rotor and a different magnetic field arrangement from Imris. Although test data on the Imris generator is not available, it is believed that the present invention has superior performance characteristics.

SUMMARY OF THE INVENTION

In one respect, the invention involves an electrical machine having two relatively movable members, the first such member having a field producing means for producing a magnetic field, and the second member having sets of conductors mounted thereon. These conductors include (1) outside conductors which are connected together at spaced connection points to form a continuous loop, and (2) inside conductors which have their outer ends connected to the spaced connection points on the outside loop. Each of the inside conductors has an output electrical connection at its inner end. With this arrangement, each outside conductor and the inside conductors connected to its connection points form an inside loop that occupies only a portion of the circumference of the member; and, there are a plurality of such inside loops. The magnetic field is positioned so that relative movement between the first and second members moves the inside loops sequentially through the magnetic field to induce a current and produce a potential difference between the output electrical connections associated with each inside loop.

Preferably, means are provided for rotating the members relative to each other so that the device acts as a generator. Preferably, there are two magnetic fields which have their magnetic lines of force running in opposite directions. One of the members is rotatable relative to the other about a rotational axis, and the magnetic lines of force extend at least partially in a direction which is parallel to the rotational axis. The distance from the rotational axis to the connection points is greater than the distance from the rotational axis to locations on the outside conductors between the connection points. Each inside conductor is an element in two adjacent inside loops, and the inside and outside loops share a common outside conductor. The inside and outside conductors extending from each connection point are disposed so that their movement through one of the magnetic fields tends to induce opposed currents in the inside conductor and the outside conductor within such a field.

In another respect, the electrical machine has a first member with field producing means and a second member having a plurality of circumferentially spaced sectors each of which has a conductive loop formed of a leading leg and a trailing leg which are connected to each other at a connection point located at a radially outermost part of the loop. Each loop has two output connections which are spaced from its radially outermost part. The members are rotationally movable relative to each other about a rotational axis so that the loops move successively through the magnetic field. Output conductors which are not portions of any loop are connected at the output connections of the loop for conducting electricity to or from the respective loop. The leading and trailing legs associated with each connection point are oriented differently from each other relative to a radius drawn from the rotational axis to the connection point so that the ratio of L1 to L2 changes during relative movement between the first and second members, where L1 is the length of the leading leg portion in the magnetic field and L2 is the length of the trailing leg portion in the magnetic field.

BRIEF DESCRIPTION OF THE DRAWINGS

The invention will be more fully understood when considered in conjunction with the following detailed description and the attached figures.

DETAILED DESCRIPTION

A first preferred embodiment of the high efficiency generator in accordance with the invention will be described below, with reference to the appended drawings. Like reference numbers refer to the same part throughout the various views shown in the drawings.

Figure 1:
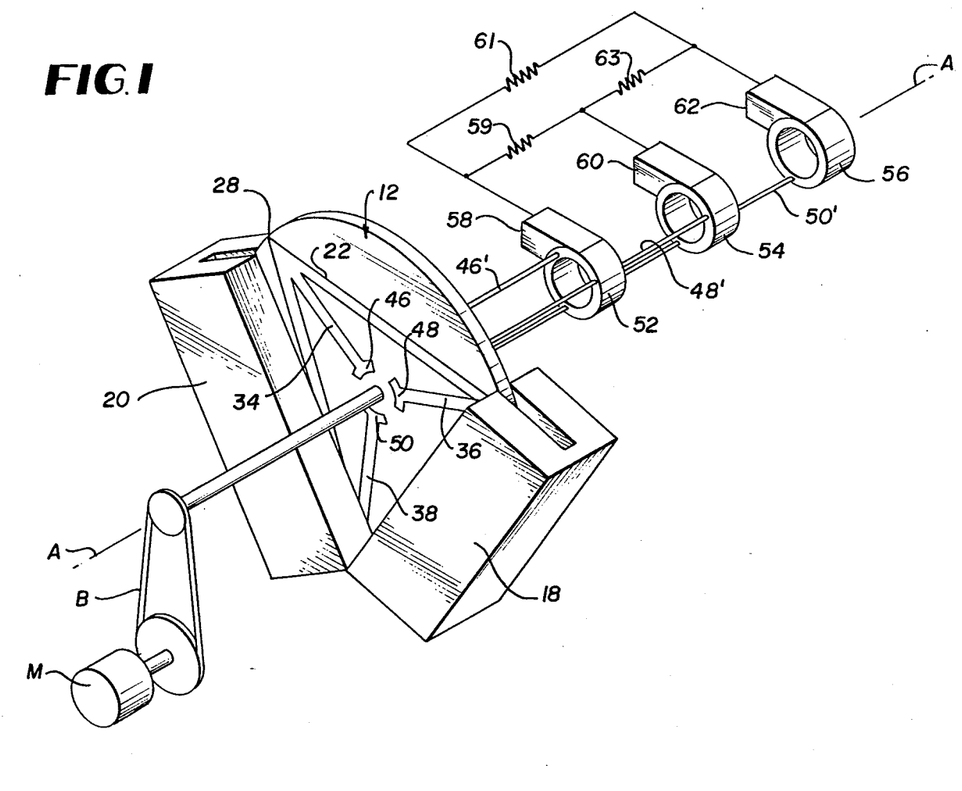
FIG. 1 is a fragmentary exploded diagrammatic view of a generator constructed in accordance with the invention.

As shown in FIG. 1, a motor M drives belt B to rotate a disk shaped rotor member 12 about an axis A-A. The rotor disk 12 extends into a pair of slots formed in two permanent magnets 18 and 20 which form the stator member.

Figure 2:
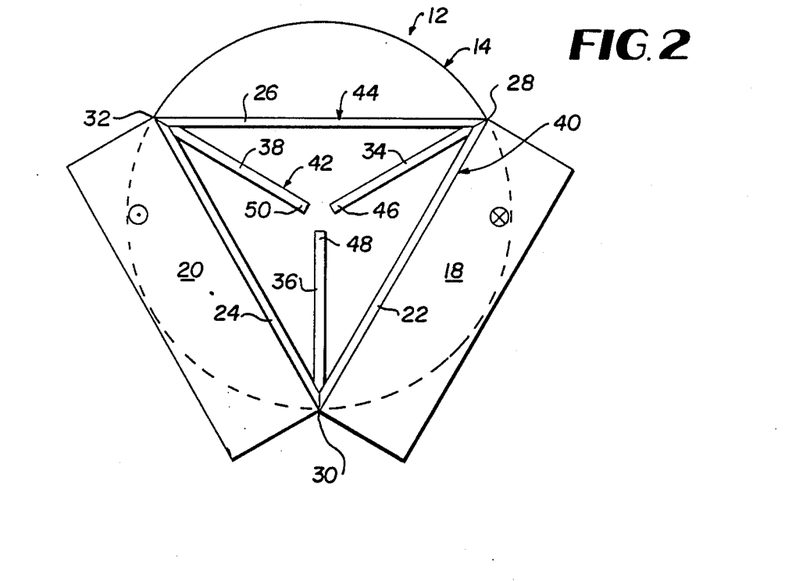
FIG. 2 is a front view of the magnet and rotor used in the invention.
Figure 3:
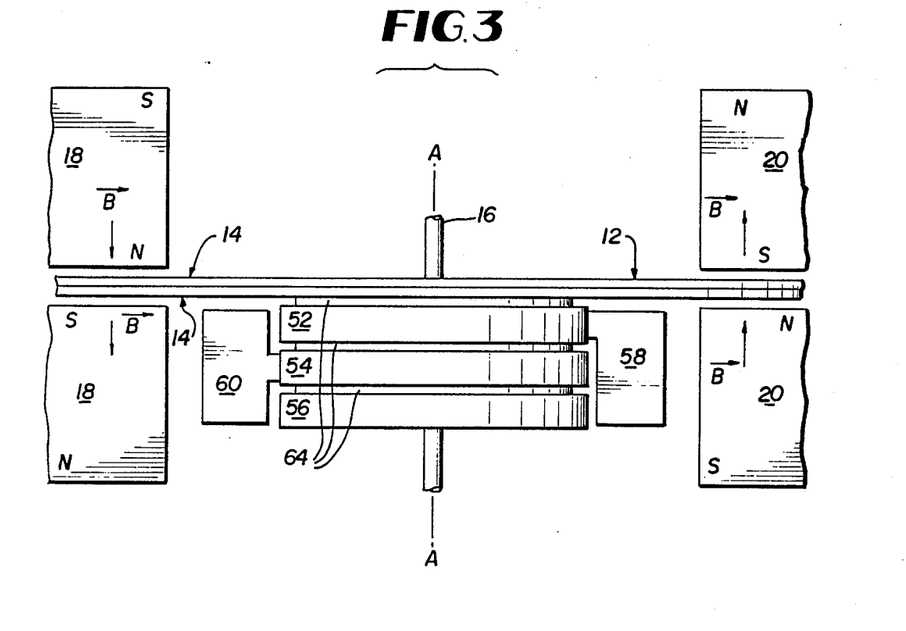
FIG. 3 is a side view of the rotor and magnets of the generator and further shows the slip ring/brush assemblies.

As shown in FIGS. 2 and 3, the rotor includes a rotor 12 fitted with an array of copper bar conductors 22, 24, 26, 34, 36, and 38 which are electrically connected together and fitted into grooves in two stacked pieces 14 of a dielectric material which are formed to give the overall rotor 12 a disk-like circular shape. The pieces 14 are advantageously formed of NEMA Grade G-10 laminated plastic and medium weave glass fabric/epoxy resin, 50,000 psi and minimum tensile. The rotor disk may have a diameter of 44 inches and a thickness of one inch, and it may rotate at about 5400 revolutions per minute.

The rotor 12 is mounted on a shaft and rotated about a rotational axis A to move the rotor conductors through two oppositely directed magnetic fields. The magnets 18 and 20 are constructed and arranged to provide magnetic fields of equal strength and opposite directions. The magnetic field location and strength is advantageously chosen such that the total magnetic flux across the rotor 12 is zero at all times during rotation.

On the rotor 12, an outside loop is made of three outside conductors 22,24 and 26 connected at 28,30 and 32 at the apexes of the equilateral triangle. Inside conductors 34,36,38 have their outer ends connected to the connection points 28,30,32. Each inside conductor has an electrical output connection 46,48,50 at its inner end which is located within the outside loop. These electrical output connections are connected to slip ring and brush assemblies as will be described later in this specification.

The array of inside conductors and outside conductors form a plurality of inside loops, each of which occupies only a portion of the rotor's circumference. Inside conductors 34 and 36 combine with outside conductor 22 to form an inside loop 40. Likewise, inside conductors 36 and 38 and outside conductor 24 form an inside loop 42; and, conductors 34,38, and 26 form a third inside loop 44. Each inside conductor 34,36,38 is an element in two adjacent inside loops; and each outside conductor 22,24,26 is an element in both the outside loop and one inside loop. The distance from the rotational axis to the connection points 28,30 and 32 is greater than the distance from the rotational axis to locations on the outside conductors between the connection points.

Although the inside and outside conductors are preferentially made of bars of solid copper welded together, a plurality of copper wires may be used for each conductor. Any conductive material may be used, although copper is preferred in view of its low electrical resistance and its relatively low cost. It is expected that superconducting materials will be used in the future.

The magnets 18 and 20 are positioned such that magnetic fields are radially spaced from the rotational axis A-A, preferably by a distance which is at least $\frac{1}{2}$ R, where R is the distance from the rotational axis to the connection points 28,30, and 32. Optimally, the edges of the two magnetic fields will coincide with two of the outside conductors at three times during each revolution. If the magnetic fields were spaced further from the rotor axis, there would be a longer time period when none of the conductor bars were in the magnetic field. If the fields were moved closer together, there would be problems at the corners, where oppositely directed magnetic fields would overlap. Thus, for optimum electrical output, it is advantageous for the magnetic field edges and the outside conductors to coincide. At all times during rotation, the total magnetic flux through the continuous outside loop formed by the conductors 22, 24, and 26 is zero, and the total magnetic flux through the inside loops and inside conductors 34, 36, and 38 is continuously varying.

FIGS. 1 and 3 more particularly show the relationship between the rotor 12, and the output electrical systems. Three slip rings 52,54, and 56 are shown in FIG. 1. Brush 58 is associated with slip ring 52, brush 60 is in contact with slip ring 54, and slip ring 56 has an associated brush assembly 62.

The output electrical connection 46 of inside conductor 34 includes an axially extending copper rod 46' that is electrically connected to the slip ring 52. A similar rod 48' extends from the connection 48 of conductor 36, through an insulating sleeve (not shown) in slip ring 52, and to the slip ring 54 to which it is electrically connected. Rod 50' extends from the output connection of conductor 38, through insulating sleeves in the slip rings 52 and 54, and to the slip ring 56 where it is electrically connected. Instead of having only one conductor rod extending from each inside conductor to its respective slip ring, a plurality of parallel rods is preferred for maximum output.

As shown in FIG. 3, nylon insulators 64 are provided between the individual slip rings to prevent electrical contact between the rings. The slip rings 52,54, and 56 rotate with the rotor 12. The stationary brushes 58,60, and 62 receive the electrical energy generated by the motion of the conductors through the magnetic fields, and this energy is transmitted to loads which are schematically shown at 59,61 and 63 (see FIG. 1). The slip rings 52,54, and 56 are preferably made of certified oxygen free electronic grade copper (UNS-C10100). Seven or more brushes may be associated with each slip ring to maximize output and reduce arcing.

The operation of the generator will be described in conjunction with FIGS. 4A-4D. It has long been known that moving an electrical conductor across the flux lines of a magnetic field induces a current within the conductor. The maximum amount of current is generated when the conductor moves perpendicular to the lines of force of the magnetic field. For this reason, the generator of this invention preferably has the magnetic field lines of force running parallel to the axis of rotation. In any case, the magnetic field vector must have a component which lies parallel to the rotational axis A-A.

FIGS. 4A-4D are arranged in a chronological sequence to show the effect of rotation at different times during each revolution. At the instant shown in FIG. 4A, the edges of the magnetic fields coincide with the outside loop so there is no induced electrical current. Due to the clockwise direction of rotation, outside conductor 22 is the leading conductor, and inside conductor 34 is the trailing conductor.

Figure 4A:
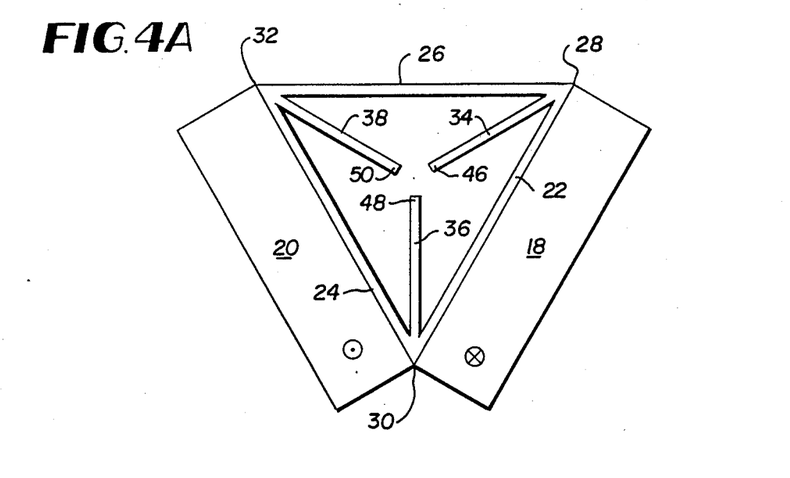
FIGS. 4A-4D depict the rotor positions at various times during the rotation cycle.
Figure 4B:
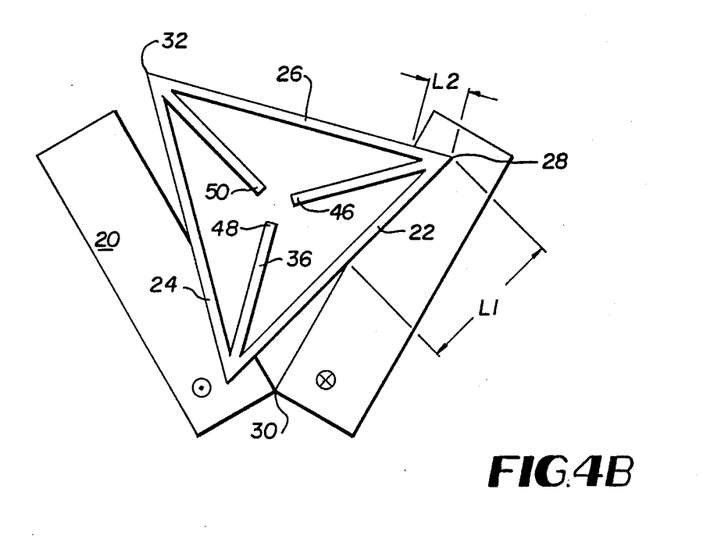

A short time later, as shown in FIG. 4B, the conductors on the rotor 12 have moved into the magnetic fields produced by the magnets. Referring to the portion of inside loop 40 that is in the field of magnet 18, it will be seen that the length L1 of the outside conductor 22 that is in the magnetic field is much greater than the length L2 of the inside conductor 34 that is in the same magnetic field. The ratio L1:L2 changes continuously throughout the rotation of the rotor 12.

The movement of the conductors 22 and 34 through the field induces a current in each conductor. The currents induced in the conductors are oppositely directed as both currents go toward the connection point 28. The magnetic field induces an electric charge distribution on the surface and within both the inside and outside conductors, and this charge distribution changes during rotation. However, since the induced electric field in leg L1 is greater than the induced electric field in leg L2, there is no equilibrium so a resultant current will flow in loop 40.

The same situation occurs in loop 42 except that, due to the oppositely directed magnetic field from magnet 20, the current in conductors 24 and 36 flows away from rather than toward the connection point 30. The induced currents produce a potential difference between each pair of the output electrical connections 46,48, and 50. The output electrical connections conduct the electrical output to the slip ring/brush assemblies which carry the generated electricity to the loads 59,61 and 63 schematically shown in FIG. 1.

Figure 4C:
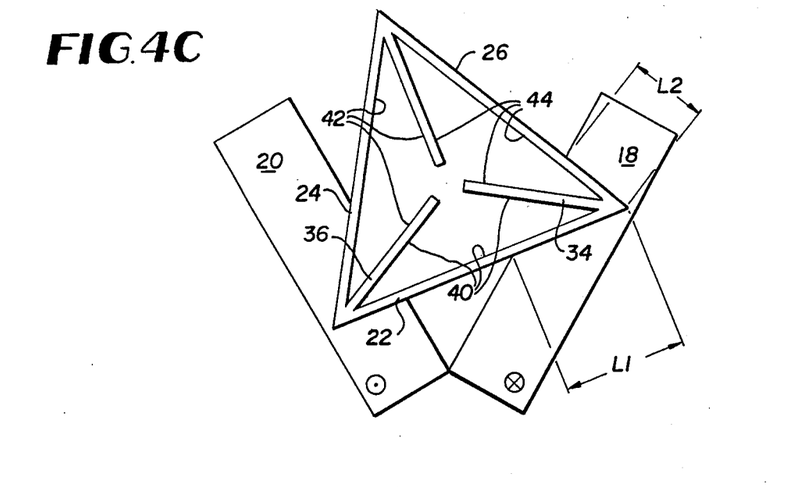

FIG. 4C shows the position of rotor 12 at a later moment in time. Note that the total magnetic flux through each individual inside loop 40,42, and 44 varies continuously during rotation. More of loop 44 is within the magnetic field of magnet 18, as the loops are sequentially moved through the magnetic fields. The length of L2 has increased while the length of L1 has decreased, thus the ratio of L1 to L2 has decreased during the time between FIGS. 4B and 4C. The current induced in conductors 22 and 34 tends to flow toward the connection point 28. Likewise, the current in conductors 24 and 36 flows away from the connection point 30. There is also a current component going into connection point 28 from outside conductor 26. There is also a current contribution from the leg of conductor 22 in the magnetic field of magnet 20 The direction that the overall resultant current would flow at connection point 28 is dependent upon the angular position of the rotor.

Figure 4D:
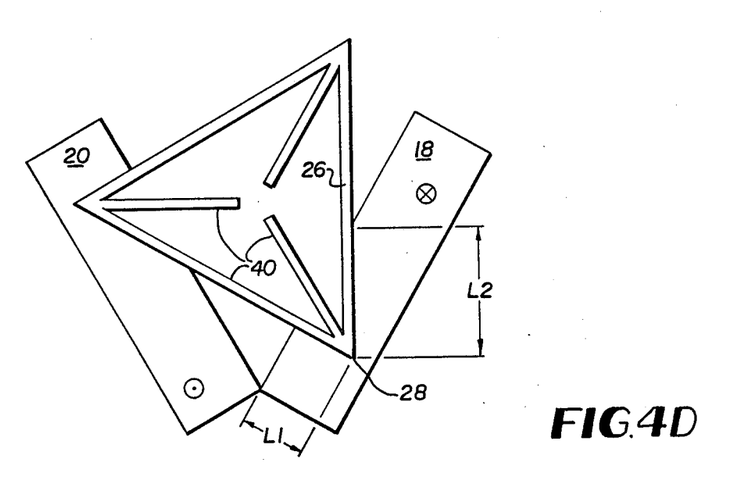

FIG. 4D is a schematic view of the rotor at a later time in the rotation cycle. At this instant, L2 is longer than L1. The induced currents are still tending to go toward the connection point 28. There are contributing current components from conductor 26 and the part of inside loop 40 that is in the magnetic field of magnet 20 where the induced currents tend to move away from connection point 30. As previously described, the resultant potential difference is conducted to the slip ring/brush assemblies.

While the invention has been described in detail with the particular triangular configuration as the basis, various other embodiments may be used to practice the invention. These will be described in conjunction with FIGS. 5-8.

Figure 5:
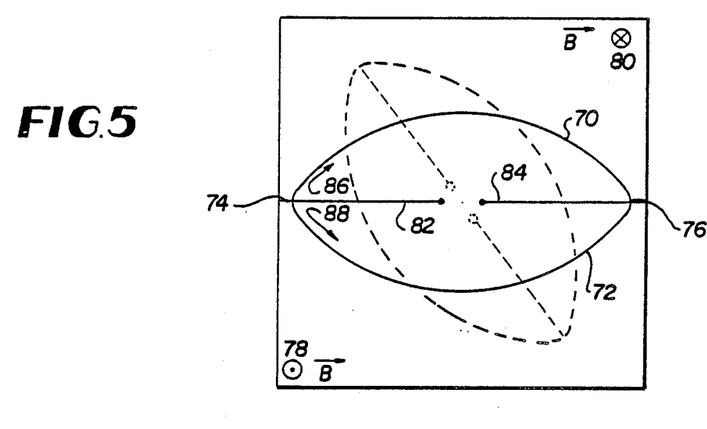
FIG. 5 shows a second embodiment of the invention.

FIG. 5 shows a two-sided outer loop of conductors, in a generally elliptical shape. Its rotational axis passes through the center of the ellipse. In general terms, this is a two-sided outer loop, wherein the two ends of both outside conductors are connected together at the connection points 74,76, and the outside conductors 70,72 are spaced from each other at all locations between the connection points. Two magnets 78 and 80 are shown which advantageously have equal magnitude in opposite directions. The inside conductors 82 and 84 are aligned with the axis of the ellipse, and they are connected to the outside bars at the connection points 74 and 76, thus forming one inside loop 86 including the conductors 82,70,84, and another inside loop 88 formed by the conductors 82,72,84. The output electrical connections are similar to the slip ring/brush assemblies described above. The broken lines show the rotor position after a short time into the rotation cycle. The total magnetic flux across the outside loop of conductors remains zero at all times during rotation, while the total magnetic flux across the inside loops 86 and 88 varies continuously. Twice during each revolution, the borders of the magnetic field coincide with the solid lines in FIG. 5

Figure 6:
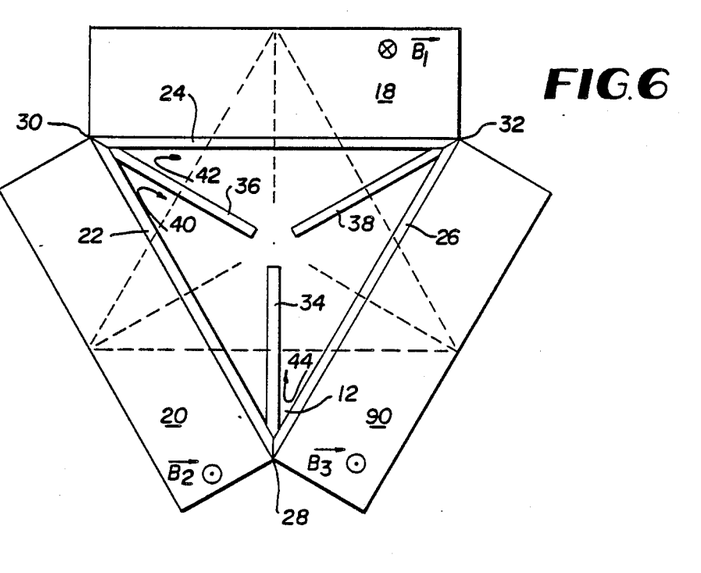
FIG. 6 shows an embodiment with a triangular rotor using three magnetic fields.

FIG. 6 shows a triangular rotor design similar to that shown in the embodiments of FIGS. 1-3. However, in FIG. 6 there is a third magnet 90. Opposing magnetic fields from magnets 18 and 20 are shown, and additional magnet 90, has its field in the same direction as magnet 20. To maintain zero total magnetic flux across the outside loop, the strength of magnet 18 is twice the strength of magnets 20 and 90.

Figures 7, 8:
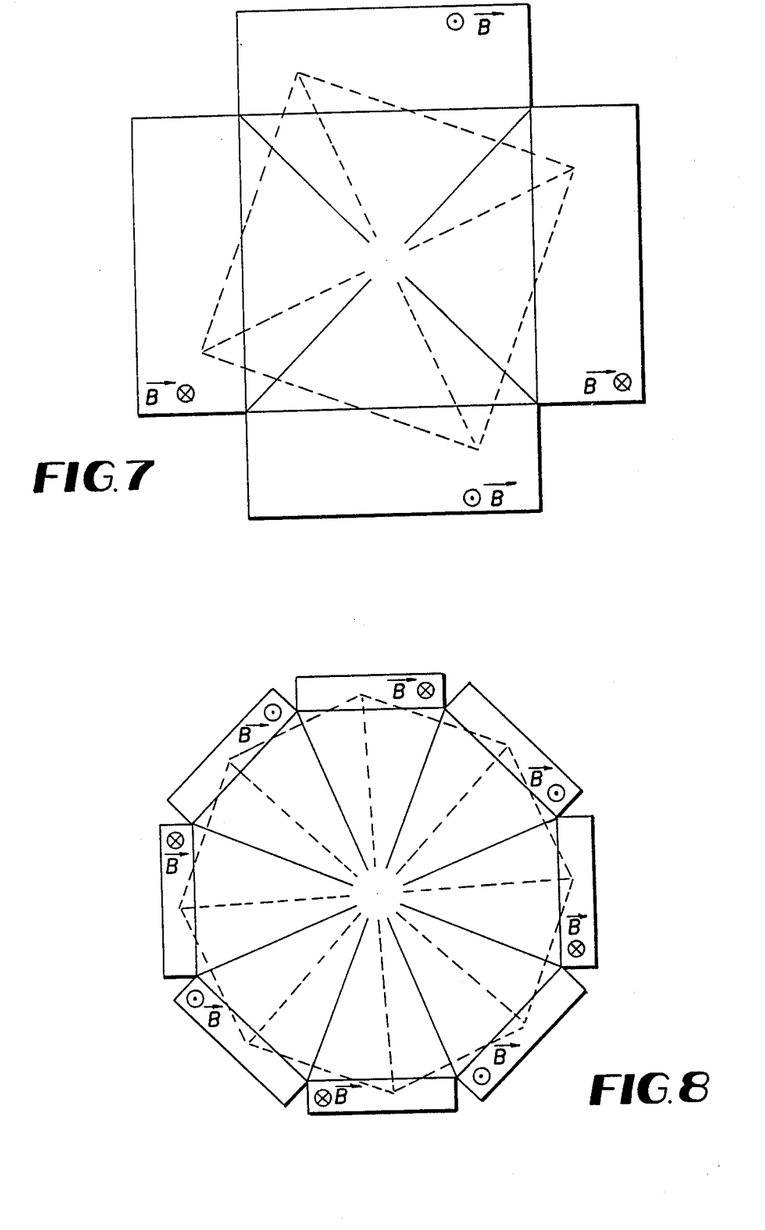
FIG. 7 shows an embodiment with a square rotor assembly.
FIG. 8 shows an embodiment with an octagonal rotor assembly.

FIG. 7 shows a square embodiment of the rotor of the invention. In this configuration, there are four inside loops and four inside conductors. All of the magnets are of equal strength, the field from two going in one direction, and the other two oriented such that their fields are in the opposite direction.

An octagonal rotor is shown in FIG. 8. It has eight inside conductors and eight inside loops. The eight magnets are of equal strength, and they are oriented such that the overall magnetic flux is zero. The operation of this system is evident from the previous descriptions of the other embodiments.

It is not essential that the conductors be the moving member in the generator. All that is required is that there be relative motion between the conductors and the magnetic fields It is apparent that the design could be readily changed such that the magnets are moved and the conductors remain stationary, thus eliminating the need for a slip ring/brush assembly.

The arrangement of the conductors or the rotor and the positioning of the rotor with respect to the magnetic field has shown an improved efficiency over traditional electrical generating machines. The drive motor does not require as much energy and the efficiency of the generator is improved When the invention is used as a motor, high mechanical output energy is expected, relative to the amount of electrical input energy consumed.

While the invention has been described with particular conductor arrangements and embodiments in mind, various changes and modifications may be made without departing from the scope of the invention as described in the appended claims.

I claim:
1. An electrical machine, comprising
   a first member including field producing means for producing at least one magnetic field;
   a second member having outside conductors, inside conductors, and output electrical connections thereon;
   said members being movable relative to each other;
   said outside conductors being connected together at spaced connection points to form a continuous outside loop;
   said inside conductors having outer ends connected to the spaced connection points on said outside loop, each of said inside conductors having an inner end located within said outside loop;
   said output electrical connections being at the inner ends of the inside conductors;
   each said outside conductor and the inside conductors connected to its connection points forming an inside loop that occupies only a portion of the circumference of said second member, whereby there is a plurality of said inside loops;
   said magnetic field and said inside loops being positioned so that relative movement between said members moves the inside loops sequentially through the magnetic field to induce a current and produce a potential difference between the output electrical connections associated with each inside loop.
2. An electrical machine as claimed in claim 1, wherein said means for producing a magnetic field is positioned such that at least two magnetic fields have edges which align with two edges of the outside loop.
3. An electrical machine as claimed in claim 1, including means for rotating one of said members about a rotational axis.

4. An electrical machine as claimed in claim 3, wherein the distance from the rotational axis to the connection points of said outside conductor is greater than the distance from the rotational axis to locations between the connection points of said outside conductor.

5. An electrical machine as claimed in claim 3, wherein said outside conductors are linear.

6. An electrical machine as claimed in claim 5, wherein said outside loop is in the shape of a polygon.

7. An electrical machine as claimed in claim 6, wherein said polygon is an equilateral polygon.

8. An electrical machine as claimed in claim 6, wherein the number of inside conductors is equal to the number of sides of the polygon.

9. An electrical machine as claimed in claim 6, wherein said outside loop is in the shape of an equilateral triangle.

10. An electrical machine as claimed in claim 6, wherein said outside loop is in the shape of a square.

11. An electrical machine as claimed in claim 3, wherein there are only two outside conductors, said outside conductors having both ends connected together and being spaced apart from each other at locations between their ends.

12. An electrical machine as claimed in claim 1, wherein said inside conductors and outside conductors are disposed so that their movement through said magnetic field tends to induce oppositely directed currents in the inside conductors and the outside conductors within said field.

13. An electrical machine as claimed in claim 1, wherein the magnetic field induces an electric charge distribution on the surface and within both the inside and outside conductors, whereby the electric charge distribution changes during rotation.

14. An electrical machine as claimed in claim 1, wherein said means for producing a magnetic field includes a permanent magnet.

15. An electrical machine as claimed in claim 1, wherein said machine is a generator, said machine including a motor for moving the members relative to each other.

16. An electrical machine as claimed in claim 1, further including at least two slip ring and brush assemblies connected to said output electrical connections.

17. An electrical machine as claimed in claim 1, wherein said inside and outside conductors are solid bars of electrical conducting material.

18. An electrical machine as claimed in claim 1, wherein said inside and outside loops share a common outside conductor.

19. An electrical machine as claimed in claim 1, wherein each said inside conductor is an element in two adjacent inside loops.

20. An electrical machine as claimed in claim 1, wherein a load is connected between two of said output electrical connections.

21. An electrical machine as claimed in claim 1, wherein said means for producing a magnetic field produces lines of force forming at least two magnetic fields.

22. An electrical machine as claimed in claim 21, wherein means for moving said members includes means for rotating one of said members about a rotational axis and said lines of force extend at least partially in a direction which is parallel to the rotational axis.

23. An electrical machine as claimed in claim 22, wherein said rotational axis is parallel to said lines of force.

24. An electrical machine as claimed in claim 21, wherein said two magnetic fields have their lines of force running in opposite directions.

25. An electrical machine as claimed in claim 22, wherein the means for producing a magnetic field provides a total magnetic flux of zero across said continuous outside loop at all times during rotation.

26. An electrical machine as claimed in claim 22, wherein the total magnetic flux through the inside conductors varies during rotation.

27. An electrical machine as claimed in claim 22, wherein the total magnetic flux through the inside loops varies during rotation.

28. An electrical machine as claimed in claim 22, wherein the field producing means produces magnetic fields with at least two edges which periodically coincide with at least two of the outside conductors.

29. An electrical machine as claimed in claim 22, wherein said field producing means produces a magnetic field having an edge positioned at least $\frac{1}{2}$ R from the rotational axis, wherein R is the distance from the rotational axis to the connection point of the outside conductors.

30. An electrical machine, comprising,
a first member including field producing means for producing at least one magnetic field,
a second member having a plurality of circumferentially spaced sectors, each said sector having a conductive loop including a leading leg and a trailing leg which are connected to each other at a connection point located at a radially outermost part of the loop, each loop having two output connections which are spaced from the radially outermost part of the loop,
said first and second members being rotationally movable relative to each other about a rotational axis so that the loops move successively through the magnetic field,
output conductor means which are not portions of any loop, said output conductor means being connected at the output connections of said loops for conducting electricity to or from the second member,
said leading and trailing legs being oriented differently from each other relative to a radius drawn from the rotational axis to the connection point so that the ratio between L1 to L2 changes during relative movement of the first and second members, where L1 is the length of the leading leg positioned in the magnetic field and L2 is the length of the trailing leg positioned in the magnetic field.

31. An electrical machine as claimed in claim 30, wherein said magnetic field means has an edge which aligns periodically with one of said legs during relative rotational movement of said members.

32. An electrical machine as claimed in claim 30, including means for rotating one of said members about a rotational axis.

33. An electrical machine as claimed in claim 32, wherein said legs are linear.

34. An electrical machine as claimed in claim 33, wherein said conductive loops are interconnected to form an outside loop which is in the shape of a polygon.

35. An electrical machine as claimed in claim 34, wherein said outside loop is in the shape of an equilateral triangle.

36. An electrical machine as claimed in claim 30, wherein said means for producing a magnetic field includes a permanent magnet.

37. An electrical machine as claimed in claim 30, wherein said machine is a generator, said machine including a motor for moving the members relative to each other.

38. An electrical machine as claimed in claim 30, further including at least two slip ring and brush assemblies connected to said output connections.

39. An electrical machine as claimed in claim 30, wherein said conductive loop is formed of solid bars of electrical conducting material.

40. An electrical machine as claimed in claim 30, wherein a load is connected between two of said output connections.

41. An electrical machine as claimed in claim 30, wherein said means for producing a magnetic field produces lines of force forming at least two circumferentially spaced magnetic fields.

42. An electrical machine as claimed in claim 41, wherein means for moving said members includes means for rotating one of said members about said rotational axis, and said lines of force extend at least partially in a direction which is parallel to the rotational axis.

43. An electrical machine as claimed in claim 42 wherein said rotational axis is parallel to said lines of force.

44. An electrical machine as claimed in claim 41, wherein said two magnetic fields have their lines of force running in opposite directions.

45. An electrical machine as claimed in claim 42, wherein the means for producing a magnetic field provides a total magnetic flux of zero across said second member at all times during rotation.

46. An electrical machine as claimed in claim 42, wherein the total magnetic flux through the conductive loops varies during rotation.

47. An electric machine as claimed in claim 42, wherein the field producing means produces magnetic fields with edges which periodically coincide with at least two of said legs of the second member.

48. An electrical machine as claimed in claim 42, wherein said field producing means produces a magnetic field having an edge positioned at least ½ R from the rotational axis, wherein R is the distance from the rotational axis to the connection point of the leading and trailing legs.

49. An electrical machine, comprising
a first member including field producing means for producing lines of magnetic force forming at least two magnetic fields, wherein said two magnetic fields have their magnetic lines of force running in opposite directions;
a second member having outside conductors, inside conductors, and output electrical connections thereon;
means for rotating one of said members relative to the other about a rotational axis, said magnetic lines of force extending at least partially in a direction which is parallel to the rotational axis;
said outside conductors being connected together at spaced connection points to form a continuous outside loop, wherein the distance from the rotational axis to the connection points is greater than the distance from the rotational axis to locations on the outside conductors between the connection points,
said first member being positioned relative to said second member such that the field producing means provides a total magnetic flux of zero across said continuous outside loop at all times during rotation;
said inside conductors having outer ends connected to the spaced connection points on said outside loop, each of said inside conductors having an inner end located within said outside loop;
said electrical output connections being at the inner ends of the inside conductors;
each of said outside conductors and the inside conductors connected to its connection points forming an inside loop that occupies only a portion of the circumference of said second member, whereby there is a plurality of said inside loops, each inside conductor being an element in two adjacent inside loops, said inside and outside loops sharing a common outside conductor,
said magnetic fields and said inside loops being positioned so that relative movement between said first and second members moves the inside loops sequentially through said fields to induce a current and produce a potential difference between the output electrical connections associated with each inside loop;
said magnetic fields being disposed to provide a total magnetic flux through the inside loops which varies during rotation;
said inside and outside conductors extending from each connection point being disposed so that their movement through one of said magnetic fields tends to induce opposed currents in the inside conductor and the outside conductor within said field.

50. An electrical machine as claimed in claim 49, wherein said field producing means is positioned such that at least two magnetic fields have edges which periodically coincide with two edges of the outside loop.

51. An electrical machine as claimed in claim 49, including means for rotating one of said members about a rotational axis.

52. An electrical machine as claimed in claim 51, wherein said outside conductors are linear.

53. An electrical machine as claimed in claim 52, wherein said outside loop is in the shape of a polygon.

54. An electrical machine as claimed in claim 53, wherein said polygon is an equilateral polygon.

55. An electrical machine as claimed in claim 53 wherein said outside loop is in the shape of an equilateral triangle.

56. An electrical machine as claimed in claim 49, wherein said means for producing a magnetic field includes a permanent magnet.

57. An electrical machine as claimed in claim 49, wherein said machine is a generator, said machine including a motor for moving the members relative to each other.

58. An electrical machine as claimed in claim 49, further including at least two slip ring and brush assemblies connected to said output electrical connections.

59. An electrical machine as claimed in claim 49, wherein said inside and outside conductors are solid bars of electrical conducting material.

60. An electrical machine as claimed in claim 49, wherein said inside and outside loops share a common outside conductor.

61. An electrical machine as claimed in claim 49, wherein each said inside conductor is an element in two adjacent inside loops.

62. An electrical machine as claimed in claim 49, wherein a load is connected between two of said output electrical connections.

63. An electrical machine as claimed in claim 49, wherein said rotational axis is parallel to said lines of force.

64. An electrical machine as claimed in claim 49, wherein the total magnetic flux through the inside conductors varies during rotation.

65. An electrical machine as claimed in claim 49, wherein the total magnetic flux through the inside loops varies during rotation.

66. An electrical machine as claimed in claim 49, wherein the field producing means produces magnetic fields with at least two edges which periodically coincide with at least two of the outside conductors.

67. An electrical machine as claimed in claim 49, wherein said field producing means produces a magnetic field having an edge positioned at least $\frac{1}{2}$ R from the rotational axis, wherein R is the distance from the rotational axis to the connection point of the outside conductors.

* * * * *